United States Patent
Lee et al.

(10) Patent No.: US 11,794,754 B2
(45) Date of Patent: Oct. 24, 2023

(54) VEHICLE AND METHOD OF CONTROLLING THE SAME

(71) Applicants: Hyundai Motor Company, Seoul (KR); Kia Corporation, Seoul (KR)

(72) Inventors: Sungwook Lee, Seoul (KR); Sungsoo Kim, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 199 days.

(21) Appl. No.: 17/389,784

(22) Filed: Jul. 30, 2021

(65) Prior Publication Data
US 2022/0089165 A1  Mar. 24, 2022

(30) Foreign Application Priority Data
Sep. 18, 2020 (KR) .................. 10-2020-0120531

(51) Int. Cl.
*B60W 40/09* (2012.01)
*B60W 30/18* (2012.01)
*B62D 15/02* (2006.01)

(52) U.S. Cl.
CPC ...... *B60W 40/09* (2013.01); *B60W 30/18109* (2013.01); *B62D 15/021* (2013.01); *B60W 2520/105* (2013.01); *B60W 2520/14* (2013.01); *B60W 2520/16* (2013.01); *B60W 2520/18* (2013.01)

(58) Field of Classification Search
CPC .......... B60W 40/09; B60W 30/18109; B60W 2520/105; B60W 2520/14; B60W 2520/16; B60W 2520/18; B62D 15/021
See application file for complete search history.

(56) References Cited

U.S. PATENT DOCUMENTS

| | | | | |
|---|---|---|---|---|
| 2009/0089002 A1* | 4/2009 | Walter | ............ | B60T 8/172 702/96 |
| 2010/0332126 A1* | 12/2010 | Huang | ............ | G01C 21/30 701/532 |
| 2011/0202225 A1* | 8/2011 | Willis | ............ | G01C 25/005 702/85 |
| 2014/0260517 A1* | 9/2014 | Demerly | ............ | G01C 25/005 73/1.38 |
| 2015/0338430 A1* | 11/2015 | Gorjestani | ............ | G01P 15/00 702/141 |
| 2016/0047675 A1* | 2/2016 | Tanenhaus | ............ | G01C 21/16 702/104 |

(Continued)

*Primary Examiner* — Jeff A Burke
*Assistant Examiner* — Mohamad O El Sayah
(74) *Attorney, Agent, or Firm* — MORGAN, LEWIS & BOCKIUS LLP

(57) ABSTRACT

A vehicle includes an inertial measurement unit (IMU); and a controller electrically connected to the IMU. The controller is configured to receive an output signal including at least one of an angular velocity and an acceleration from the IMU, to identify a driving state of the vehicle according to at least one of the output signal, a steering angle of the vehicle, a steering angular velocity of the vehicle, a number of gear stages of the vehicle, a wheel speed of the vehicle, and a braking pressure of the vehicle, to identify an offset and an offset reliability of the output signal according to the driving state of the vehicle, and to transmit a signal from which the offset is removed from the output signal according to the offset and the offset reliability.

17 Claims, 8 Drawing Sheets

(56) References Cited

U.S. PATENT DOCUMENTS

| | | | |
|---|---|---|---|
| 2017/0217410 A1* | 8/2017 | Kerber | B60T 8/17636 |
| 2017/0234988 A1* | 8/2017 | Jafari | G01C 21/12 |
| | | | 701/1 |
| 2017/0247038 A1* | 8/2017 | Savaresi | B60W 40/107 |
| 2019/0152471 A1* | 5/2019 | Mitsumoto | B60T 8/17557 |
| 2020/0039481 A1* | 2/2020 | Aitidis | B60W 40/02 |
| 2021/0207961 A1* | 7/2021 | Saini | G01C 21/165 |
| 2021/0370914 A1* | 12/2021 | Li | B60T 7/22 |
| 2022/0063670 A1* | 3/2022 | Zhu | B60W 60/0015 |

* cited by examiner

VEHICLE AND METHOD OF CONTROLLING THE SAME

CROSS-REFERENCE TO RELATED APPLICATION(S)

The present application claims priority to Korean Patent Application No. 10-2020-0120531, filed on Sep. 18, 2020, the entire contents of which is incorporated herein for all purposes by this reference.

BACKGROUND OF THE INVENTION

Field of the Invention

The present invention relates to a vehicle and a method of controlling the vehicle.

Description of Related Art

An inertial measurement unit (IMU) of a vehicle outputs acceleration and/or angular velocity signals, and is used as an important signal for identifying an attitude and/or a driving situation of the vehicle in the fields of autonomous driving, chassis control, and safety control of the vehicle.

The signal of the IMU may have an arbitrary offset depending on the manufacturing distribution, temperature, and environment, and if the offset is not properly processed, it may adversely affect the identification of the vehicle's attitude and driving state, which may cause a major problem in the safety of the vehicle.

A signal offset processing method of a conventional IMU includes Fast Offset Cancellation (FOC) and Slow Offset Cancellation (SOC). The FOC is a method of determining and removing an average of sample sensor values at an initial stage of power application. A required time is within about 0.5 seconds, but a residual error MAX may be 10 to 12 LSB. The SOC is a method of continuously removing the offset by assuming a residual value remaining after the FOC as the offset. The required time may be up to 100 seconds, and 1LSB value per 10 seconds may be continuously removed.

The signal offset processing method of the conventional IMU requires a relatively long time, and it is difficult to expect an appropriate offset removal performance in an unexpected situation of the vehicle, that is, in an urgent situation due to an offset residual error.

Furthermore, since the signal offset processing method of the conventional IMU is a method of adding or subtracting a value of the IMU to 0 regardless of a driving condition of the vehicle, there is a limit that it cannot be guaranteed that a value after an existing offset processing is a physical true value.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle configured for minimizing an error range of a signal due to an offset that compensates for disadvantages of signal offset processing of a conventional inertial measurement unit (IMU) and performing the offset processing at a high speed, and a method of controlling the vehicle.

Additional aspects of the present invention will be set forth in part in the description which follows, and in part, will be obvious from the description, or may be learned by practice of the present invention.

According to various aspects of the present invention, there is provided a vehicle including: an inertial measurement unit (IMU); and a controller electrically connected to the IMU. The controller is configured to receive an output signal including at least one of an angular velocity and an acceleration from the IMU, to identify a driving state of the vehicle according to at least one of the output signal, a steering angle of the vehicle, a steering angular velocity of the vehicle, a number of gear stages of the vehicle, a wheel speed of the vehicle, and a braking pressure of the vehicle, to identify an offset and an offset reliability of the output signal according to the driving state of the vehicle, and to transmit a signal from which the offset is removed from the output signal according to the offset and the offset reliability.

The driving state may include a straight state in which the vehicle goes straight at a speed, a turning state in which the vehicle turns below a predetermined speed, a stop state in which the vehicle stops, and a non-overturning state in which the vehicle drives below the predetermined speed.

In a response to the driving state being the straight state and the output signal including a traverse acceleration value, the controller may be configured to identify the traverse acceleration value as a transverse acceleration offset and to remove the transverse acceleration offset from the output signal according to a control amount of the transverse acceleration offset.

In a response to the driving state being the turning state and the output signal including a longitudinal acceleration value, the controller may be configured to identify the longitudinal acceleration value as a longitudinal acceleration offset and to remove the longitudinal acceleration offset from the output signal according to a control amount of the longitudinal acceleration offset.

The controller may be configured to: in a response to the driving state being the stop state and the output signal including a yaw rate, identify the yaw rate as a yaw rate offset and remove the yaw rate offset from the output signal according to a control amount of the yaw rate offset, in a response to the driving state being the stop state and the output signal including a roll rate, identify the roll rate as a roll rate offset and remove the roll rate offset from the output signal according to a control amount of the roll rate offset, in a response to the driving state being the stop state and the output signal including a pitch rate, identify the pitch rate as a pitch rate offset and remove the pitch rate offset from the output signal according to a control amount of the pitch rate offset, and in a response to the driving state being the stop state and the output signal including a vertical acceleration value, identify the vertical acceleration value as a vertical acceleration offset and remove the vertical acceleration offset from the output signal according to a control amount of the vertical acceleration offset.

The controller may be configured to determine a reliability of a longitudinal offset according to the wheel speed of the vehicle and a longitudinal acceleration value included in the output signal, and to determine a reliability of a vertical acceleration offset according to a vertical acceleration value and a pitch rate and a roll rate included in the output signal.

The controller may be configured to determine a reliability of a transverse acceleration offset according to the wheel speed of the vehicle and a traverse acceleration value and a yaw rate included in the output signal, and to determine a reliability of a yaw rate offset according to the wheel speed of the vehicle and the traverse acceleration value and the yaw rate included in the output signal.

The controller may be configured to determine a reliability of a roll rate offset according to a roll rate included in the output signal, and to determine a reliability of a pitch rate offset according to a pitch rate included in the output signal.

The vehicle may further include a memory. The controller may be configured to identify an offset generation probability section corresponding to an offset size according to the offset generation probability according to the offset size stored in the memory and a probability distribution function of the offset generation probability section, according to a three-dimensional (3D) graph of an offset removal control amount according to the offset generation probability section and the offset reliability stored in the memory and the offset reliability, to identify a control amount of the offset, and to remove the offset from the output signal according to the control amount of the offset.

According to various aspects of the present invention, there is provided a method of controlling a vehicle including: receiving, by a controller electrically connected to an inertial measurement unit (IMU), an output signal including at least one of an angular velocity and an acceleration from the IMU of the vehicle; identifying, by the controller, a driving state of the vehicle according to at least one of the output signal, a steering angle of the vehicle, a steering angular velocity of the vehicle, a number of gear stages of the vehicle, a wheel speed of the vehicle, and a braking pressure of the vehicle; identifying, by the controller, an offset and an offset reliability of the output signal according to the driving state of the vehicle; and transmitting, by the controller, a signal from which the offset is removed from the output signal according to the offset and the offset reliability.

The driving state may include a straight state in which the vehicle goes straight at a speed, a turning state in which the vehicle turns below a predetermined speed, a stop state in which the vehicle stops, and a non-overturning state in which the vehicle drives below the predetermined speed.

The identifying of the offset of the output signal may include, in a response to the driving state being the straight state and the output signal including a traverse acceleration value, identifying the traverse acceleration value as a transverse acceleration offset and removing the transverse acceleration offset from the output signal according to a control amount of the transverse acceleration offset.

The identifying of the offset of the output signal may include, in a response to the driving state being the turning state and the output signal including a longitudinal acceleration value, identifying the longitudinal acceleration value as a longitudinal acceleration offset and removing the longitudinal acceleration offset from the output signal according to a control amount of the longitudinal acceleration offset.

The identifying of the offset of the output signal may include, in a response to the driving state being the stop state and the output signal including a yaw rate, identifying the yaw rate as a yaw rate offset and removing the yaw rate offset from the output signal according to a control amount of the yaw rate offset; and in a response to the driving state being the stop state and the output signal including a roll rate, identifying the roll rate as a roll rate offset and removing the roll rate offset from the output signal according to a control amount of the roll rate offset; in a response to the driving state being the stop state and the output signal including a pitch rate, identifying the pitch rate as a pitch rate offset and removing the pitch rate offset from the output signal according to a control amount of the pitch rate offset; and in a response to the driving state being the stop state and the output signal including a vertical acceleration value, identifying the vertical acceleration value as a vertical acceleration offset and removing the vertical acceleration offset from the output signal according to a control amount of the vertical acceleration offset.

The identifying of the offset reliability of the output signal may include determining a reliability of a longitudinal offset according to the wheel speed of the vehicle and a longitudinal acceleration value included in the output signal; and determining a reliability of a vertical acceleration offset according to a vertical acceleration value and a pitch rate and a roll rate included in the output signal.

The identifying of the offset reliability of the output signal may include determining a reliability of a transverse acceleration offset according to the wheel speed of the vehicle and a traverse acceleration value and a yaw rate included in the output signal; and determining a reliability of a yaw rate offset according to the wheel speed of the vehicle and the traverse acceleration value and the yaw rate included in the output signal.

The identifying of the offset reliability of the output signal may include determining a reliability of a roll rate offset according to a roll rate included in the output signal; and determining a reliability of a pitch rate offset according to a pitch rate included in the output signal.

The method may further include identifying, by the controller, an offset generation probability section corresponding to an offset size according to the offset generation probability according to the offset size stored in a memory of the vehicle and a probability distribution function of the offset generation probability section; according to a three-dimensional (3D) graph of an offset removal control amount according to the offset generation probability section and the offset reliability stored in the memory and the offset reliability, identifying, by the controller, a control amount of the offset; and removing, by the controller, the offset from the output signal according to the control amount of the offset.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
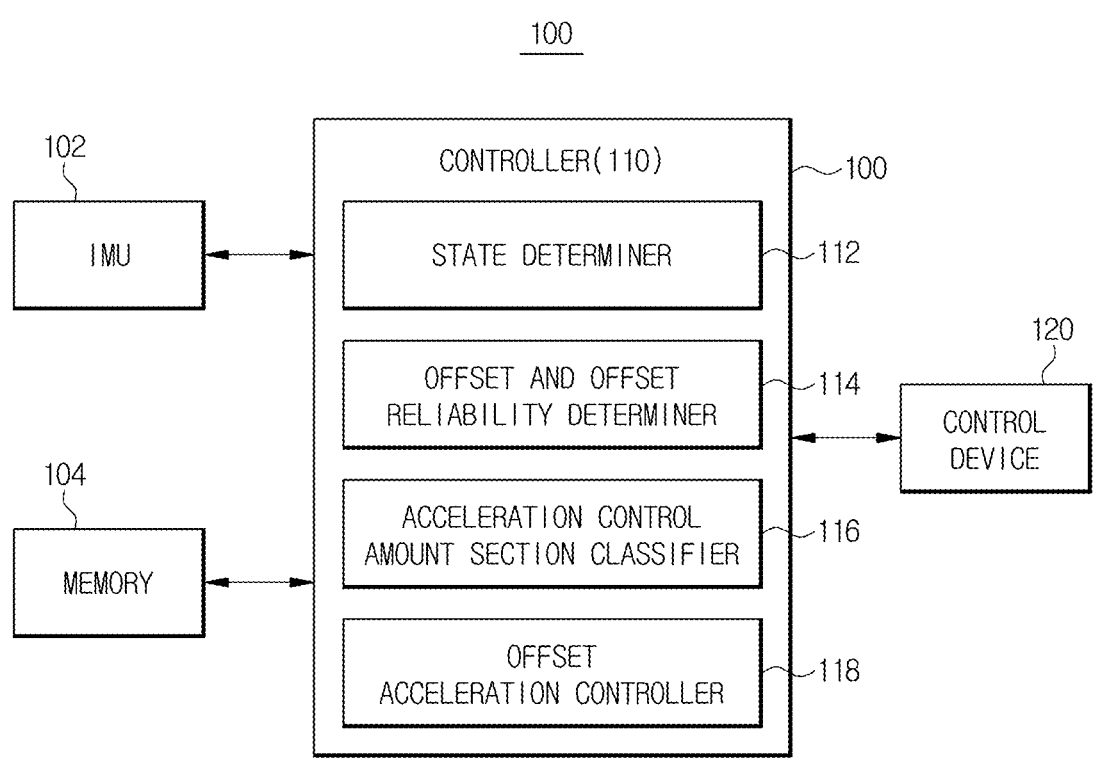
FIG. 1 is a block diagram of a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Like reference numerals refer to like elements throughout the specification. Not all elements of the exemplary embodiments of the present invention will be described, and the description of what are commonly known in the art or what overlap each other in the exemplary embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections may not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the present invention will be described with reference to accompanying drawings.

FIG. 1 is a block diagram of a vehicle according to an exemplary embodiment of the present invention.

A vehicle 100 may include an inertial measurement unit (IMU) 102, a memory 104, a controller 110, and/or at least one control device 120.

The IMU 102 (inertial measurement device) may include at least one sensor configured for measuring a speed, a direction, a gravity, an acceleration, and/or an angular velocity of a moving object.

The IMU 102 is an acceleration sensor configured for measuring acceleration in vertical, transverse and/or longitudinal directions, and an angular velocity sensor configured for measuring angular velocity of a roll rate, a pitch rate, and/or a yaw rate.

For example, the IMU 102 may include a 6-axis IMU sensor. The 6-axis IMU sensor may include a longitudinal G sensor that measures acceleration in the longitudinal direction, a transverse G sensor that measures acceleration in the transverse direction, and a vertical G sensor that measures acceleration in the vertical direction.

Furthermore, the 6-axis IMU sensor may include a roll rate sensor that measures the roll rate, a yaw rate sensor that measures the yaw rate (rotation angular velocity), and a pitch rate sensor that measures the pitch rate.

The IMU 102 may primarily remove an offset of a signal of acceleration and/or angular velocity based on Fast Offset Cancellation (FOC) and Slow Offset Cancellation (SOC), which are signal offset processing methods.

Under a control of the controller 110, the signal of the acceleration and/or the angular velocity from which the offset is primarily removed by the IMU 102 may be transmitted to the controller 110.

The memory 104 may store a variety of data used by at least one component (the IMU 102, the controller 110 and/or the control device 120) of the vehicle 100, for example, input data or output data for a software program and instructions related thereto. The memory 104 may include a volatile memory and/or a non-volatile memory.

The memory 104 may store a probability distribution function of an offset generation probability section and an offset generation probability according to an offset size predetermined by an experiment. The memory 104 may store a three-dimensional (3D) graph of the offset generation probability section predetermined by the experiment and an offset removal control amount according to offset reliability.

The controller 110 (also referred to as control device, control circuit or processor) may control at least one other component of the vehicle 100 (e.g., the hardware component (e.g., IMU camera and/or memory 104)) or the software component (software program)), and may perform various data processing and operations. The controller 110 may include an electronic control unit (ECU) that controls a power system of the vehicle 100. The controller 110 may include the processor and the memory.

The controller 110 may include an IMU integrated airbag control unit (ACU).

The controller 110 may include a state determiner 112, an offset and offset reliability determiner 114, an acceleration control amount section classifier 116, and an offset acceleration controller 118.

The state determiner 112 may identify the driving state of the vehicle 100.

The driving state is a straight state in which the vehicle 100 goes straight at a normal speed, a turning state in which the vehicle 100 turns below a predetermined speed, a stop state in which the vehicle 100 stops, and a non-overturning state in which the vehicle 100 drives the predetermined speed or lower.

The state determiner 110 may identify the driving state of the vehicle 100 based on at least one of an output signal of the IMU 102, a steering angle of the vehicle 100, a steering angular velocity of the vehicle 100, a number of gear stages of the vehicle 100, a wheel speed of the vehicle 100, or a braking pressure of the vehicle 100. A detailed description of identifying the driving state of the vehicle 100 will be described later.

The offset and offset reliability determiner 114 may identify the offset size and offset reliability of the output signal output from the IMU 102 based on an expected value and a measured value of the output signal of the IMU 102 for each driving state of the vehicle 100. The measured value may be at least one of values included in the output signal of the IMU 102. A detailed description of the expected value and the measured value will be described later.

The acceleration control amount section classifier 116 may identify the offset removal control amount based on the driving state of the vehicle 100 and the offset size and the offset reliability of the output signal of the IMU 102.

The acceleration control amount section classifier 116 may analyze the offset generation probability according to an offset size of an output signal of the IMU 102 as a standard normal distribution based on a probability distribution function stored in the memory 104. For example, the acceleration control amount section classifier 116 may identify the offset generation probability and the offset generation probability section according to the offset size of the output signal of the IMU 102 based on the probability distribution function stored in the memory 104.

The acceleration control amount section classifier 116 may identify the offset removal control amount based on the 3D graph of the offset generation probability section stored in the memory 104 and the offset removal control amount according to the offset reliability, the offset reliability of the IMU 102, and the identified offset generation probability section.

The offset acceleration controller 118 may finally remove (determine) the offset from the output signal of the IMU 102 based on the identified offset removal control amount and transmit it to the control device 104.

The control device 104 may include, for example, an antilock brake system (ABS), an electronic stability control (ESC) system, a motor driven power steering (MDPS) system 107 and/or an advanced driver assist system (ADAS) 109, and the like.

According to the above configuration, when the output signal including the angular velocity and/or the acceleration is received from the IMU 102, the controller 110 may improve signal accuracy of the IMU 102 by determining and removing the offset of the output signal including the angular velocity and/or the acceleration according to the driving state (the driving situation or a driving mode) of the vehicle 100. The offset of the output signal including the angular velocity and/or the acceleration may be a residual offset of a signal from which the offset is primarily removed from the IMU 102.

For example, the controller 110 may accelerate and control the angular velocity and/or the offset removal speed of the acceleration signal based on the residual offset value to rapidly remove the angular velocity and/or an offset value of the acceleration signal according to the driving state of the vehicle. The angular velocity and/or the acceleration signal from which the offset is removed may be applied to safety control, chassis control, autonomous driving control, etc. of the vehicle 100, ensuring the accuracy and robustness of each control technology.

Meanwhile, although not illustrated in FIG. 1, the vehicle 100 may further include a steering angle sensor, and the controller 110 may identify the steering angle and/or the steering angular velocity of the vehicle 100 based on the output signal of the steering angle sensor. For example, the controller 110 may receive the output signal from the steering angle sensor through a controller area network (CAN) communication circuit to identify the steering angle and/or the steering angular velocity of the vehicle 100.

Furthermore, although not illustrated in FIG. 1, the vehicle 100 may further include a wheel speed sensor, and the controller 110 may identify the wheel speed of the vehicle 100 based on the output signal of the wheel speed sensor of the vehicle 100. For example, the controller 110 may identify the wheel speed of the vehicle 100 by receiving the output signal from the wheel speed sensor through the CAN communication circuit.

Furthermore, although not illustrated in FIG. 1, the vehicle 100 may change a driving direction of the vehicle 100 according to the driver's steering control, and may further include a steering device including a steering wheel, a steering gear and/or a steering link, etc. The controller 110 may identify the number of gear stages of the vehicle 100 according to the driver's manipulation of the steering gear. For example, the controller 110 may identify the number of gear stages of the vehicle 100 by receiving the signal according to the manipulation of the steering gear through the CAN communication circuit.

Furthermore, although not illustrated in FIG. 1, the vehicle 100 may stop a driving of the vehicle 100 according to a driver's braking control so that the vehicle 100 stops, and may further include a braking device including a master cylinder, a brake disc, a brake pad, a brake pedal, etc. The controller 110 may identify the braking pressure of the vehicle 100 according to the driver's manipulation of the braking device. For example, the controller 110 may receive the signal according to the manipulation of the braking device through the CAN communication circuit, and may receive the braking input of the vehicle 100.

Figure 2:
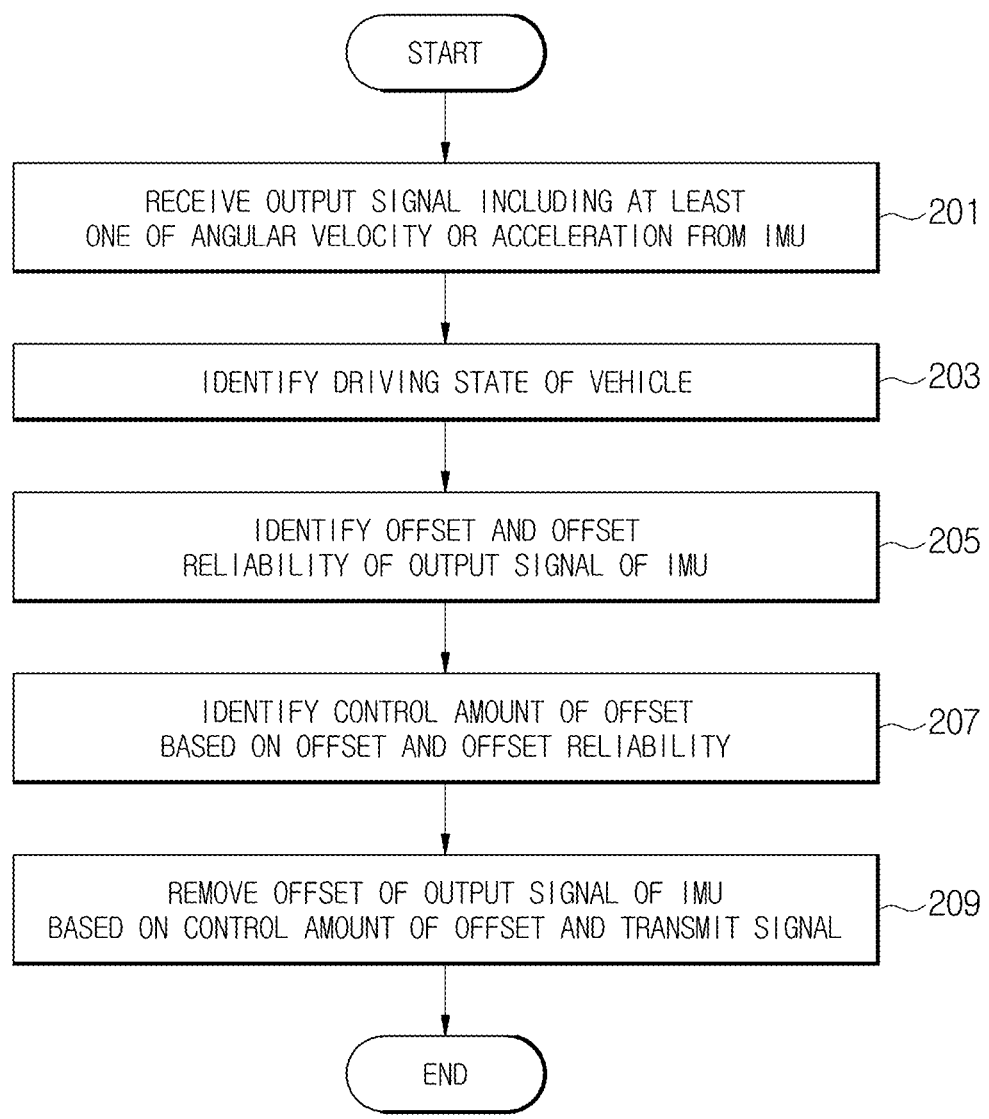
FIG. 2 is a flowchart illustrating an operation of a vehicle according to an exemplary embodiment of the present invention.

FIG. 2 is a flowchart illustrating an operation of a vehicle according to an exemplary embodiment of the present invention.

The vehicle 100 may receive the output signal including at least one of the angular velocity or the acceleration from the IMU 102 (201).

The angular velocity may include an angular velocity of the roll rate, the pitch rate and/or the yaw rate. The acceleration may include vertical, transverse, and/or longitudinal acceleration.

The vehicle 100 may identify the driving state of the vehicle 100 (203).

The vehicle 100 may identify the driving state of the vehicle 100 based on at least one of the output signal of at least one of the angular velocity or the acceleration received from the IMU 102, the steering angle of the vehicle 100, the steering angular velocity of the vehicle 100, the number of gear stages of the vehicle 100, the wheel speed of the vehicle 100, or the braking pressure of the vehicle 100.

The driving state is the straight state in which the vehicle 100 goes straight at the normal speed, the turning state in which the vehicle 100 turns below the predetermined speed, the stop state in which the vehicle 100 stops, and the non-overturning state in which the vehicle 100 drives the predetermined speed or lower.

The vehicle 100 may identify the straight state of the vehicle 100 based on the steering angle of the vehicle 100, the steering angular velocity, the number of gears and/or the wheel speed. The vehicle 100 may identify the stop state of the vehicle 100 based on the number of gear stages, the braking pressure, and/or the wheel speed of the vehicle 100. The vehicle 100 may identify the turning state of the vehicle 100 based on the steering angle, the steering angular velocity, and/or the wheel speed of the vehicle 100. The vehicle 100 may identify the non-overturning state of the vehicle 100 based on the wheel speed of the vehicle 100.

For example, a speed section for each driving state, a driving state entry condition, and a driving state release condition may be as illustrated in Table 1 below.

TABLE 1

| driving state | speed section | driving state entry condition and driving state release condition |
|---|---|---|
| straight state | normal speed (flat) | 1) \|steering angle\| < first threshold<br>2) \|steering angular velocity\| < second threshold<br>3) number of gear stages = D (drive)<br>4) ☐ (FL wheel speed + FR wheel speed + RL wheel speed + RR wheel speed) < third threshold<br>(FL: left front wheel, FR: right front wheel, RL: left rear wheel, RR: right rear wheel)<br>5) fourth threshold < FL wheel speed + FR wheel speed + RL wheel speed + RR wheel speed < fifth threshold<br>driving state entry condition: when all conditions 1), 2), 3), 4) and 5) are satisfied for more than a certain time, it is determined as straight state<br>driving state release condition: when all conditions 1), 2), 3), 4) or 5) are not satisfied for more than certain time, it is determined as straight state release |
| turning state | low speed (static) | 1) \|steering angle\| > first threshold<br>2) \|steering angular velocity\| < second threshold<br>3) FL wheel speed + FR wheel speed + RL wheel speed + RR wheel speed < fourth threshold<br>4) ☐ (FL wheel speed + FR wheel speed + RL wheel speed + RR wheel speed) < third threshold<br>driving state entry condition: when all conditions 1), 2) and 3) are satisfied for more than a certain time, it is determined as turning state<br>driving state release condition: when all conditions 1), 2) or 3) are not satisfied for more than a certain time, it is determined as turning state release |
| stop state | stop | 1) \|longitudinal acceleration\| + \|transverse acceleration\| + \|vertical acceleration\| < sixth threshold<br>2) \|yow rate\| + \| roll rate\| + \|pitch rate\| < seventh threshold<br>3) Number of gear stages = P (parking)<br>4) FL wheel speed + FR wheel speed + RL wheel speed + RR wheel speed < fourth threshold<br>5) braking pressure > eighth threshold<br>driving state entry condition: when all conditions 1), 2), 3) and 4) are satisfied for more than certain time or, when all conditions 1), 2), 4) and 5) are satisfied for more than certain time, it is determined as stop state.<br>driving state release condition: when all conditions 1), 2) or 4) are not satisfied for more than certain time period, it is determined as the stop state release |
| non-overturning state | low speed | mobile terminal and television receiver connect directly wirelessly (paragraph 26)<br>1) roll rate < ninth threshold<br>2) transverse acceleration < tenth threshold<br>3) vertical acceleration < eleventh threshold<br>4) longitudinal acceleration < 12th threshold<br>5) \|(FL wheel speed + RL wheel speed) – (FR wheel speed + RR wheel speed)\| < 13th threshold<br>6) pitch rate < 14th threshold<br>driving state entry condition: when all conditions 1), 2), 3), 4), 5) and 6) are satisfied for more than certain time, it is determined as non-overturning state<br>driving state release condition: when all conditions 1), 2), 3), 4), 5) or 6) are not satisfied for more than certain time, it is determined as non-overturning state release |

The vehicle 100 may identify the offset and the offset reliability of the output signal of the IMU 102 based on the driving state of the vehicle 100 (205).

The vehicle 100 may identify an offset and offset reliability of the angular velocity of the longitudinal, transverse and/or vertical acceleration and/or the roll rate, the pitch rate, and the yaw rate.

In a response to the driving state of the vehicle 100 being the straight state and the output signal of the IMU 102 including a transverse acceleration value, the transverse acceleration value may be identified as a transverse acceleration offset.

In a response to the driving state being the turning state and the output signal of the IMU 102 including the longitudinal acceleration value, the vehicle 100 may identify the longitudinal acceleration value as the longitudinal acceleration offset.

The vehicle 100 may identify the yaw rate as a yaw rate offset in a response to the driving state being the stop state and the output signal of the IMU 102 including the yaw rate.

The vehicle 100 may identify the roll rate as a roll rate offset in a response to the driving state being the stop state and the output signal of the IMU 102 including the roll rate.

The vehicle 100 may identify the pitch rate as a pitch rate offset in a response to the driving state being the stop state and the output signal of the IMU 102 including the pitch rate.

The vehicle 100 may identify a vertical acceleration value as a vertical acceleration offset in a response to the driving state being the stop state and the output signal of the IMU 102 including the vertical acceleration value.

The vehicle 100 may determine the reliability of the longitudinal acceleration offset based on the wheel speed of the vehicle 100 and the longitudinal acceleration value included in the output signal of the IMU 120. For example, the reliability of the offset of the longitudinal acceleration may be determined when the driving state of the vehicle 100 is the straight state.

The vehicle 100 may determine the reliability of the vertical acceleration offset based on the vertical acceleration value, the pitch rate, and the roll rate included in the output signal of the IMU 120. For example, the reliability of the vertical acceleration offset may be determined when the driving state of the vehicle 100 is the straight state.

The vehicle 100 may determine the reliability of the transverse acceleration offset based on the wheel speed of the vehicle 100 and the transverse acceleration value and yaw rate included in the output signal of the IMU 120. For example, the reliability of the offset of the transverse acceleration may be determined when the driving state of the vehicle 100 is the turning state.

The vehicle 100 may determine the reliability of the yaw rate offset based on the wheel speed of the vehicle 100 and a traverse acceleration value and the yaw rate included in the output signal of the IMU 120. For example, the reliability of the yaw rate offset may be determined when the driving state of the vehicle 100 is the turning state.

The vehicle 100 may determine the reliability of the roll rate offset based on the roll rate included in the output signal. For example, the reliability of the roll rate offset may be determined when the driving state of the vehicle 100 is the non-overturning state.

The vehicle 100 may determine the reliability of the pitch rate offset based on the pitch rate included in the output signal. For example, the reliability of the pitch rate offset may be determined when the driving state of the vehicle 100 is the non-overturning state.

For example, the vehicle 100 may identify the offset size and offset reliability of the output signal of the IMU 102 according to the driving state of the vehicle 100, as illustrated in Table 2 below.

TABLE 2

| driving state | offset identification | offset reliability identification |
|---|---|---|
| straight state | 1) transverse acceleration offset value = measured transverse acceleration value | 1) offset reliability of longitudinal acceleration = \|expected value of longitudinal acceleration − measured longitudinal acceleration\|/(expected value of longitudinal acceleration) * 100 (%) <br> 2) offset reliability of vertical acceleration = \|expected value of vertical acceleration − measured vertical acceleration\|/(expected value of vertical acceleration) * 100 (%) <br> expected value of longitudinal acceleration = □ (FL wheel speed + FR wheel speed + RL wheel speed + RR wheel speed)/4 <br> expected value of vertical acceleration = Σ (pitch rate + roll rate)/factor <br> factor: any predetermined value or tuning parameter |
| turning state | 1) longitudinal acceleration offset value = measured longitudinal acceleration value | 1) offset reliability of transverse acceleration = \|expected value of longitudinal acceleration − measured transverse acceleration\|/(expected value of transverse acceleration) * 100 (%) <br> 2) yaw rate offset reliability = \|yaw rate expected value − measured yaw rate\|/(rate expected value) * 100 (%) <br> expected value of transverse acceleration = (FL wheel speed + FR wheel speed + RL wheel speed + RR wheel speed)/4 * yaw rate <br> yaw rate expected value = transverse acceleration/(FL wheel speed + FR wheel speed + RL wheel speed + RR wheel speed)/4) |
| stop state | 1) yaw rate offset value = measured yaw rate value <br> 2) roll rate offset value = measured roll rate value <br> 3) pitch rate offset value = measured pitch rate value <br> 4) vertical acceleration | |

TABLE 2-continued

| driving state | offset identification | offset reliability identification |
|---|---|---|
| | offset value = measured vertical acceleration value | |
| non-overturning state | | 1) roll rate offset reliability = 1/\|measured roll rate\|<br>2) pitch rate offset reliability = 1/\|measured pitch rate\|<br>roll rate expected value = 0<br>pitch rate expected value = 0 |

The vehicle 100 may identify a control amount of the offset based on the offset and the offset reliability (207).

The vehicle 100 may analyze the offset of then output signal of the IMU 102. The offset of the output signal of the IMU 102 may include the offset of the angular velocity of the longitudinal acceleration, and the transverse acceleration, and/or the angular velocity of the roll rate, the pitch rate, and the yaw rate.

Figure 3A:
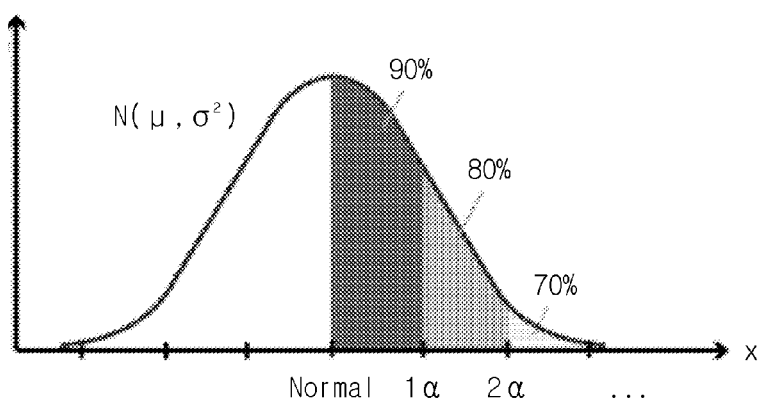
FIG. 3A and FIG. 3B are views exemplarily illustrating a three-dimensional (3D) graph of a standard normal distribution of an offset of an output signal of an inertial measurement unit (IMU), an offset generation probability section, and an offset removal control amount according to offset reliability according to an exemplary embodiment of the present invention.

The vehicle 100 may convert the offset of the output signal of the IMU 102 into the standard normal distribution. The vehicle 100 may analyze the offset generation of the output signal according to the size of the offset based on the output signal of the IMU 102, that is, normalize, and may classify the offset generation probability section according to the offset generation probability as a. For example, the vehicle 100 may identify the offset generation probability section corresponding to the size of the offset based on the probability distribution function of a standard normal distribution curve as illustrated in FIG. 3A stored in the memory 104.

The vehicle 100 may identify a control amount of the offset, that is, the offset removal control amount (also referred to as an SOC acceleration control amount) based on the offset generation probability section identified according to the standard normal distribution and the offset reliability (%) identified according to the above-described operation. For example, the vehicle 100 may identify the offset removal control amount corresponding to the identified offset generation probability section and the identified offset reliability based on 3D graph of the offset generation probability section and the offset removal control amount according to the offset reliability as illustrated in FIG. 3B stored in the memory 104.

Figure 3B:
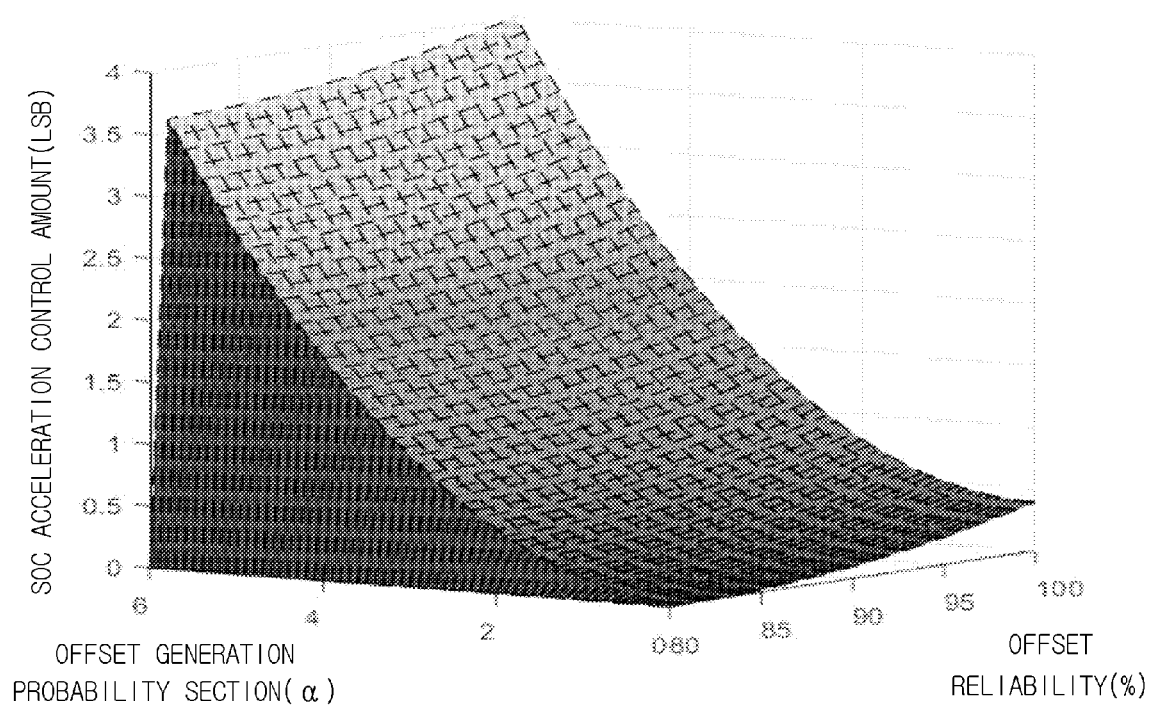

Referring to FIG. 3B, when the offset reliability is equal to or greater than a predetermined reference value, for example, 80% or higher, the vehicle 100 may identify the control amount of the offset according to the offset generation probability section and the offset reliability.

Referring to FIG. 3B, for example, when the offset generation probability section is 6 and the reliability of the offset determination is 90%, it may be understood that the control amount of the offset is 2.5 LBS (least significant bit).

The vehicle 100 may remove the offset of the output signal of the IMU 102 based on the control amount of the offset and then transmit the signal from which the offset is removed to the at least one control device 104 (209).

For example, as illustrated in Table 3 below, the vehicle 100 may identify the control amount of the offset for adding or subtracting the offset of the acceleration signal for each driving state of the vehicle 100, for each acceleration offset generation probability section. Accordingly, for example, the vehicle 100 may remove the offset of the acceleration signal in the normal +1α acceleration offset generation probability section in the straight state by ±1 LBS per 10 seconds.

TABLE 3

| | Normal | Normal + 1α | Normal + 2α | Normal + 3α | Normal + 4α | Normal + 5α | Normal + 6α |
|---|---|---|---|---|---|---|---|
| straight state | 0 | ±1 LBS per 10 sec | ±2 LBS per 10 sec | ±3 LBS per 10 sec | ±4 LBS per 10 sec | ±5 LBS per 10 sec | ±6 LBS per 10 sec |
| turning state | 0 | 0 | ±1 LBS per 10 sec | ±2 LBS per 10 sec | ±3 LBS per 10 sec | ±4 LBS per 10 sec | ±5 LBS per 10 sec |
| stop state | ±1 LBS per 10 sec | ±2 LBS per 10 sec | ±3 LBS per 10 sec | ±4 LBS per 10 sec | ±5 LBS per 10 sec | ±6 LBS per 10 sec | ±7 LBS per 10 sec |

For example, as illustrated in Table 4 below, the vehicle 100 may identify the control amount of the offset for adding or subtracting the offset of the angular velocity signal for each driving state of the vehicle 100, for each angular velocity offset generation probability section. Accordingly, for example, the vehicle 100 may remove the offset of the angular velocity signal in the normal +2α angular velocity offset generation probability section in the turning state by ±1 LBS per 10 seconds.

TABLE 4

|  | Normal | Normal + 1α | Normal + 2α | Normal + 3α | Normal + 4α | Normal + 5α | Normal + 6α |
|---|---|---|---|---|---|---|---|
| straight state | 0 | 0 | ±1 LBS per 10 sec | ±2 LBS per 10 sec | ±3 LBS per 10 sec | ±4 LBS per 10 sec | ±5 LBS per 10 sec |
| turning state | 0 | ±1 LBS per 10 sec | ±2 LBS per 10 sec | ±3 LBS per 10 sec | ±4 LBS per 10 sec | ±5 LBS per 10 sec | ±6 LBS per 10 sec |
| stop state | ±1 LBS per 10 sec | 0 | 0 | ±1 LBS per 10 sec | ±2 LBS per 10 sec | ±3 LBS per 10 sec | ±4 LBS per 10 sec |

The vehicle 100 may transmit the signal from which the offset is removed to at least one control device 104 through the CAN communication. According to the above-described embodiment, the vehicle 100 may identify the offset size and the offset reliability of the signal output from the IMU 102 for each driving state while the vehicle 100 is driving. Furthermore, the vehicle 100 may rapidly remove the signal offset without distortion of the signal. For example, even if the offset of the signal is continuously changed due to the driving state or deterioration of the vehicle 100, the vehicle 100 may determine an appropriate offset removal control amount to remove only the offset from the signal.

FIG. 4A, FIG. 4B, FIG. 4C and FIG. 4D are graphs for describing the improvement of an offset removal performance according to various exemplary embodiments of the present invention compared to a related art.

In FIG. 4A, FIG. 4B, FIG. 4C and FIG. 4D, a related art signal from which the offset from a conventional IMU itself is removed is illustrated, and a proposal illustrates a signal from which the offset is removed according to the exemplary embodiment of the present invention. A sensor true value represents the signal by a sensor that allows the offset of good performance to be minimized.

Figure 4A:
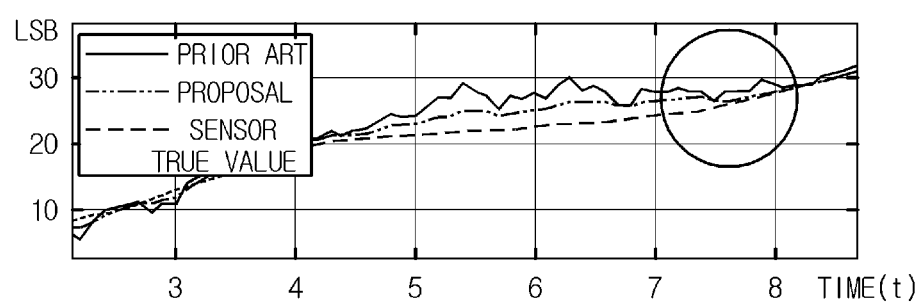
FIG. 4A, FIG. 4B, FIG. 4C and FIG. 4D are graphs for describing the improvement of an offset removal performance according to various exemplary embodiments of the present invention compared to a related art.

Referring to FIG. 4A, it may be seen that a static performance of the provided offset removal is superior compared to the related art. Accordingly, according to the exemplary embodiment of the present invention, the acceleration control for removing the offset of the signal may be performed according to the driving state of the vehicle 100.

Figure 4B:
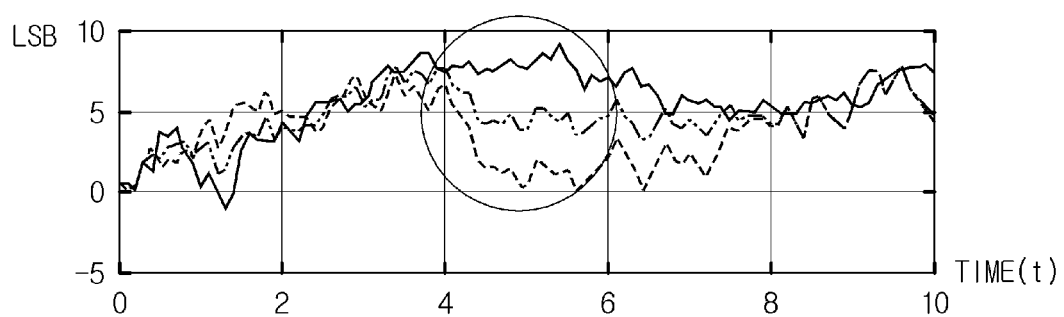

Referring to FIG. 4B, it may be seen that a provided offset removal response speed is superior compared to the related art. Accordingly, the exemplary embodiment of the present invention may perform the acceleration control of offset removal of the signal according to the offset, the offset reliability, and the offset generation probability section.

Figure 4C:
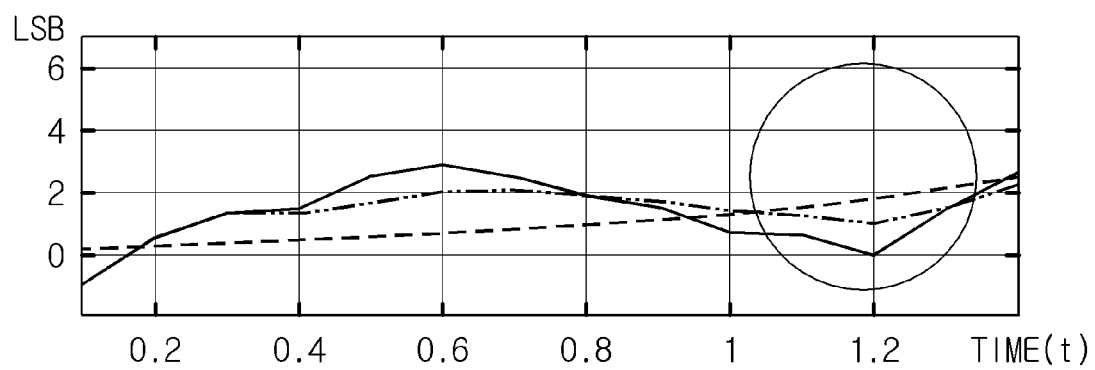

Referring to FIG. 4C, it may be seen that a provided signal distortion prevention performance is superior to the related art. Comparing the sensor true value with the related art and the proposal, compared to some of the sensor's true value outputting a + signal, in the related art, it may be seen that signal distortion is seriously generated by outputting a − signal due to the offset removal.

On the other hand, in the case of the proposal, it may be seen that signal distortion is relatively less than that of the related art.

Figure 4D:
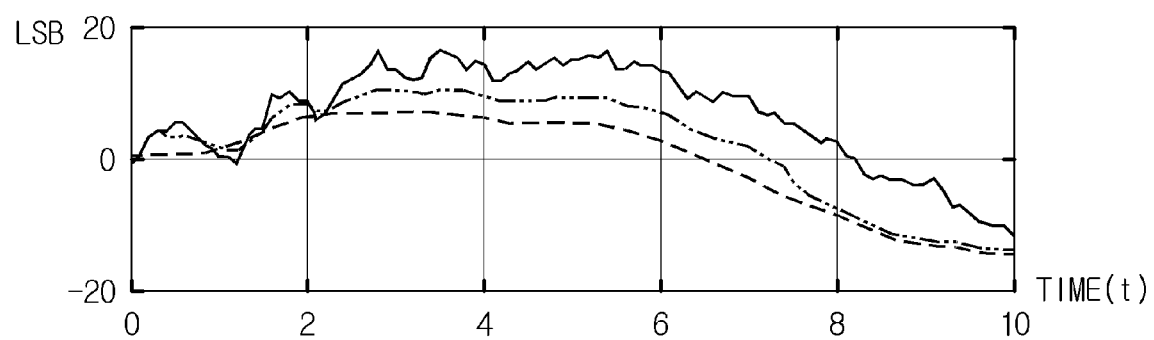

Referring to FIG. 4D, it may be seen that the offset removal performance of the proposal is improved compared to the related art.

The vehicle and the method of controlling the vehicle according to an aspect may improve the reliability of removing the offset of the signal.

The vehicle and the method of controlling the vehicle according to an aspect may minimize an error range of the signal due to the offset and a use time of an error value. Accordingly, it is possible to minimize the accumulation of errors due to an offset processing time and offset accumulation in a signal offset processing of a conventional IMU.

The vehicle and the method of controlling the vehicle according to an aspect may identify the offset reliability by grasping the driving state of the vehicle, and perform the offset acceleration control based on the offset reliability.

The vehicle and the method of controlling the vehicle according to an aspect may control the offset of the signal for each section by dividing an acceleration control section by determining an offset generation probability distribution based on the output signal of the IMU.

The vehicle and the method of controlling the vehicle according to an aspect may prevent a malfunction by preventing rapid acceleration control according to an offset generation section of the offset reliability and a probability function.

The vehicle and the method of controlling the vehicle according to an aspect may transmit a signal with improved reliability to all control devices of the vehicle operating based on the signal of the IMU, improving reliability of the operation of the control device and simplifying a logic of signal validity determination which is separately performed by the control device.

The vehicle and the method of controlling the vehicle according to an aspect do not immediately subtract the offset, but by controlling the speed of removing the offset, minimizing the error due to the misjudgment of the offset.

The disclosed exemplary embodiments may be implemented in a form of a recording medium storing computer-executable instructions that are executable by a processor. The instructions may be stored in a form of a program code, and when executed by a processor, the instructions may generate a program module to perform operations of the disclosed exemplary embodiments. The recording medium may be implemented non-transitory as a non-transitory computer-readable recording medium.

The non-transitory computer-readable recording medium may include all types of recording media storing commands which may be interpreted by a computer. For example, the non-transitory computer-readable recording medium may be, for example, ROM, RAM, a magnetic tape, a magnetic disc, flash memory, an optical data storage device, and the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle comprising:
an inertial measurement unit (IMU);
a controller electrically connected to the IMU; and
a memory,
wherein the controller is configured to:
receive an output signal including at least one of an angular velocity and an acceleration from the IMU,
identify a driving state of the vehicle according to at least one of the output signal, a steering angle of the vehicle, a steering angular velocity of the vehicle, a number of gear stages of the vehicle, a wheel speed of the vehicle, and a braking pressure of the vehicle,
identify an offset and an offset reliability of the output signal according to the driving state of the vehicle,
transmit a signal from which the offset is removed from the output signal according to the offset and the offset reliability,
identify an offset generation probability section corresponding to an offset size according to the offset generation probability according to the offset size stored in the memory and a probability distribution function of the offset generation probability section,
according to a three-dimensional (3D) graph of an offset removal control amount according to the offset generation probability section and the offset reliability stored in the memory and the offset reliability, identify a control amount of the offset, and
remove the offset from the output signal according to the control amount of the offset.

2. The vehicle according to claim 1, wherein the driving state includes a straight state in which the vehicle goes straight at a speed, a turning state in which the vehicle turns below a predetermined speed, a stop state in which the vehicle stops, and a non-overturning state in which the vehicle drives below the predetermined speed.

3. The vehicle according to claim 2, wherein, in a response to the driving state being the straight state and the output signal including a traverse acceleration value, the controller is configured to identify the traverse acceleration value as a transverse acceleration offset and to remove the transverse acceleration offset from the output signal according to a control amount of the transverse acceleration offset.

4. The vehicle according to claim 2, wherein, in a response to the driving state being the turning state and the output signal including a longitudinal acceleration value, the controller is configured to identify the longitudinal acceleration value as a longitudinal acceleration offset and to remove the longitudinal acceleration offset from the output signal according to a control amount of the longitudinal acceleration offset.

5. The vehicle according to claim 2, wherein the controller is configured to:
in a response to the driving state being the stop state and the output signal including a yaw rate, identify the yaw rate as a yaw rate offset and remove the yaw rate offset from the output signal according to a control amount of the yaw rate offset,
in a response to the driving state being the stop state and the output signal including a roll rate, identify the roll rate as a roll rate offset and remove the roll rate offset from the output signal according to a control amount of the roll rate offset,
in a response to the driving state being the stop state and the output signal including a pitch rate, identify the pitch rate as a pitch rate offset and remove the pitch rate offset from the output signal according to a control amount of the pitch rate offset, and
in a response to the driving state being the stop state and the output signal including a vertical acceleration value, identify the vertical acceleration value as a vertical acceleration offset and remove the vertical acceleration offset from the output signal according to a control amount of the vertical acceleration offset.

6. The vehicle according to claim 2, wherein the controller is configured to:
determine a reliability of a longitudinal offset according to the wheel speed of the vehicle and a longitudinal acceleration value included in the output signal, and
determine a reliability of a vertical acceleration offset according to a vertical acceleration value and a pitch rate and a roll rate included in the output signal.

7. The vehicle according to claim 2, wherein the controller is configured to:
determine a reliability of a transverse acceleration offset according to the wheel speed of the vehicle and a traverse acceleration value and a yaw rate included in the output signal, and
determine a reliability of a yaw rate offset according to the wheel speed of the vehicle and the traverse acceleration value and the yaw rate included in the output signal.

8. The vehicle according to claim 2, wherein the controller is configured to:
determine a reliability of a roll rate offset according to a roll rate included in the output signal, and
determine a reliability of a pitch rate offset according to a pitch rate included in the output signal.

9. A method of controlling a vehicle, the method comprising:
receiving, by a controller electrically connected to an inertial measurement unit (IMU), an output signal including at least one of an angular velocity and an acceleration from the IMU of the vehicle;
identifying, by the controller, a driving state of the vehicle according to at least one of the output signal, a steering angle of the vehicle, a steering angular velocity of the vehicle, a number of gear stages of the vehicle, a wheel speed of the vehicle, and a braking pressure of the vehicle;
identifying, by the controller, an offset and an offset reliability of the output signal according to the driving state of the vehicle; and
transmitting, by the controller, a signal from which the offset is removed from the output signal according to the offset and the offset reliability;
identifying, by the controller, an offset generation probability section corresponding to an offset size according to the offset generation probability according to the offset size stored in a memory of the vehicle and a probability distribution function of the offset generation probability section;

according to a three-dimensional (3D) graph of an offset removal control amount according to the offset generation probability section and the offset reliability stored in the memory and the offset reliability, identifying, by the controller, a control amount of the offset; and removing, by the controller, the offset from the output signal according to the control amount of the offset.

10. The method according to claim 9, wherein the driving state includes a straight state in which the vehicle goes straight at a speed, a turning state in which the vehicle turns below a predetermined speed, a stop state in which the vehicle stops, and a non-overturning state in which the vehicle drives below the predetermined speed.

11. The method according to claim 10, wherein the identifying of the offset of the output signal includes:

in a response to the driving state being the straight state and the output signal including a traverse acceleration value, identifying the traverse acceleration value as a transverse acceleration offset and removing the transverse acceleration offset from the output signal according to a control amount of the transverse acceleration offset.

12. The method according to claim 10, wherein the identifying of the offset of the output signal includes:

in a response to the driving state being the turning state and the output signal including a longitudinal acceleration value, identifying the longitudinal acceleration value as a longitudinal acceleration offset and removing the longitudinal acceleration offset from the output signal according to a control amount of the longitudinal acceleration offset.

13. The method according to claim 10, wherein the identifying of the offset of the output signal includes:

in a response to the driving state being the stop state and the output signal including a yaw rate, identifying the yaw rate as a yaw rate offset and removing the yaw rate offset from the output signal according to a control amount of the yaw rate offset; and in a response to the driving state being the stop state and the output signal including a roll rate, identifying the roll rate as a roll rate offset and removing the roll rate offset from the output signal according to a control amount of the roll rate offset;

in a response to the driving state being the stop state and the output signal including a pitch rate, identifying the pitch rate as a pitch rate offset and removing the pitch rate offset from the output signal according to a control amount of the pitch rate offset; and in a response to the driving state being the stop state and the output signal including a vertical acceleration value, identifying the vertical acceleration value as a vertical acceleration offset and removing the vertical acceleration offset from the output signal according to a control amount of the vertical acceleration offset.

14. The method according to claim 10, wherein the identifying of the offset reliability of the output signal includes:

determining a reliability of a longitudinal offset according to the wheel speed of the vehicle and a longitudinal acceleration value included in the output signal; and determining a reliability of a vertical acceleration offset according to a vertical acceleration value and a pitch rate and a roll rate included in the output signal.

15. The method according to claim 10, wherein the identifying of the offset reliability of the output signal includes:

determining a reliability of a transverse acceleration offset according to the wheel speed of the vehicle and a traverse acceleration value and a yaw rate included in the output signal; and determining a reliability of a yaw rate offset according to the wheel speed of the vehicle and the traverse acceleration value and the yaw rate included in the output signal.

16. The method according to claim 10, wherein the identifying of the offset reliability of the output signal includes:

determining a reliability of a roll rate offset according to a roll rate included in the output signal; and determining a reliability of a pitch rate offset according to a pitch rate included in the output signal.

17. A non-transitory computer readable storage medium on which a program for performing the method of claim 9 is recorded.

* * * * *